(12) United States Patent
Kato et al.

(10) Patent No.: US 8,013,106 B2
(45) Date of Patent: Sep. 6, 2011

(54) OPTICAL LENS

(75) Inventors: Noriyuki Kato, Katsushika-ku (JP); Toshiaki Yamada, Katsushika-ku (JP); Eiji Koshiishi, Katsushika-ku (JP); Shu Yoshida, Katsushika-ku (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 12/227,943

(22) PCT Filed: Jun. 1, 2007

(86) PCT No.: PCT/JP2007/061208
§ 371 (c)(1),
(2), (4) Date: May 12, 2009

(87) PCT Pub. No.: WO2007/142149
PCT Pub. Date: Dec. 13, 2007

(65) Prior Publication Data
US 2010/0048855 A1 Feb. 25, 2010

(30) Foreign Application Priority Data
Jun. 5, 2006 (JP) .................................. 2006-155974

(51) Int. Cl.
*C08G 63/02* (2006.01)
*C08G 63/00* (2006.01)

(52) U.S. Cl. ........ 528/204; 359/642; 428/411; 428/412; 528/196; 528/198; 528/201; 528/206

(58) Field of Classification Search ................... 359/642; 428/411, 412; 528/196, 198, 201, 206
See application file for complete search history.

(56) References Cited

FOREIGN PATENT DOCUMENTS

| JP | 10-087800 | | 4/1998 |
|----|-----------|---|--------|
| JP | 10-101786 | * | 4/1998 |
| JP | 10-101787 | * | 4/1998 |
| JP | 2000-136220 | | 5/2000 |
| JP | 2002-309015 | | 10/2002 |
| JP | 2005-031611 | | 2/2005 |
| JP | 2005-068256 | | 3/2005 |

* cited by examiner

*Primary Examiner* — Terressa M Boykin
(74) *Attorney, Agent, or Firm* — Wenderoth, Lind & Ponack, L.L.P.

(57) ABSTRACT

An optical lens which can be produced by injection molding on an industrial scale, and which has a high refractive index, a low Abbe's number, a low birefringence index, a high transparency and a high glass transition temperature. The optical lens can be produced by injection molding of a polycarbonate resin (preferably having a reduced viscosity of 0.2 dl/g or higher and a glass transition temperature of 120 to 160° C.), wherein the polycarbonate resin is produced by reacting a diol component comprising 99 to 51 mol % of 9,9-bis(4-(2-hydroxyethoxy)phenyl)fluorene and 1 to 49 mol % of bisphenol A with a carbonate diester. It becomes possible to produce an optical lens preferably having a refractive index of 1.60 to 1.65, an Abbe's number of 30 or smaller, a birefringence index of 300 nm or lower and an all light transmittance of 85.0% or higher.

8 Claims, No Drawings

OPTICAL LENS

TECHNICAL FIELD

The present invention relates to an optical lens composed of a polycarbonate resin comprising a constituent unit derived from 9,9-bis(4-(2-hydroxyethoxy)phenyl)fluorene and a constituent unit derived from bisphenol A. More precisely, the present invention relates to an optical lens having a high refractive index, a low Abbe's number, a low birefringence index, a high transparency and a high glass transition temperature (heat resistance) in a well-balanced manner.

BACKGROUND ART

An optical glass or an optical transparent resin is used as an optical device material for optical systems of various cameras such as a camera, a film-integrated type camera and a video camera. Optical glass is excellent in heat resistance, transparency, dimensional stability, and chemical resistance and so on, and there are large variety of materials having various refractive indexes (nD) and Abbe's numbers (vD). However, it has defects that its material cost is high, and in addition, it has poor moldability and low productivity. Especially, since an extremely advanced technique and a high cost are required in order to mold an aspherical lens used for aberration correction, these defects are a great obstacle for a practical use.

Meanwhile, an optical lens composed of an optical transparent resin, especially composed of a thermoplastic transparent resin is used as a lens for cameras currently because it can be produced on a large scale by injection molding, and in addition, it has the advantage that the production of an aspheric lens is easy. Examples of the thermoplastic transparent resins include polycarbonate composed of bisphenol A, polystyrene, poly-4-methylpentene, polymethylmethacrylate and amorphous polyolefins.

However, when using the optical transparent resin as an optical lens, transparency, heat resistance and low birefringence are required in addition to a refractive index and an Abbe's number. Therefore, it has a defect that parts to be used are limited depending on the physical properties balance of the resin. For example, it is unfavorable that, since poly-4-methylpentene has a low heat resistance and polymethylmethacrylate has low glass transition temperature, low heat resistance and a small refractive index, their field to be used are limited, and, since polycarbonate composed of bisphenol A has weak points that its birefringence is large and so on, its parts to be used are limited.

On the other hand, in general, when the refractive index of an optical material is high, lens elements having the same refractive index can be realized with a surface having a smaller curvature, whereby the aberration amount generated on this surface can be reduced, and downsizing and weight reduction of a lens system can be made possible by reducing the number of lenses, by reducing the eccentricity sensitivity of lenses and by reducing the lens thickness. Therefore, a raise in a refractive index is useful.

Moreover, in an optical design of an optical unit, it is known that the chromatic aberration is corrected by using two ore more lenses having different Abbe's numbers mutually in combination with each other. For instance, a lens composed of an alicyclic polyolefin resin having the Abbe's number of 45-60 is used in combination with a lens composed of a polycarbonate resin from bisphenol A (nD=1.59, μD=29) having the low Abbe's number (nD=1.59, vD=29) to correct the chromatic aberration. Therefore, lowering the Abbe's number of an optical material is absolutely necessary.

Among the optical transparent resins which are in practical use, examples of ones having a high refractive index include polycarbonate composed of bisphenol A (nD=1.586, vD=29) and polystyrene (nD=1.578, vD=34). In particular, since the polycarbonate resin of bisphenol A has a high refractive index and is excellent in heat resistance and physical properties, its optical use has been discussed extensively. However, since both the polycarbonate resin of bisphenol A and polystyrene have the weak point where they have a high birefringence index, they have a limit in their use. Therefore, a resin for an optical use which has a high refractive index and a low birefringence index and is excellent in physical properties balance is being widely developed. Especially, in the field of a digital still camera of recent years, accompanied by the raise of the resolution by improvement in the number of pixels, a lens for cameras having a high image formation property and a lower birefringence index is being required.

Examples of means for reducing the birefringence index of the above-mentioned materials include a technique wherein compositions having birefringence indexes whose positive or negative signs are opposite from each other are combined to cancel mutual birefringence indexes with each other. Whether the sign of the birefringence index is positive or negative is determined by the difference between polarizability of the polymer main chain direction and polarizability of the polymer side chain direction. For example, a polycarbonate resin from bisphenol A wherein polarizability of the polymer main chain direction is larger than polarizability of the polymer side chain direction has a positive birefringence index and a polycarbonate resin from bisphenol having a fluorene structure whose polarizability of the polymer side chain direction is larger has a negative birefringence index. Therefore, the component ratio of the composition of these materials having a birefringence index of opposite signs is critically important.

As a method for reducing a birefringence index, there is a report of a bisphenol having a fluorene structure whose polarizability of the polymer side chain direction is larger (Patent Document 1). However, as a result of study by the inventors of the present invention, it was found that the component ratio of the resin composition in said report was insufficient for canceling a positive and negative intrinsic birefringence indexes with each other and hence a material which does not have a low birefringence index as intended was obtained.

In addition, a polycarbonate resin having a fluorene structure is disclosed (Patent Documents 2 and 3). In said document, however, only a photoelastic coefficient of a filmed polycarbonate resin was examined. The birefringence index as a so-called lens molding including both an orientation birefringence and a photoelastic birefringence was not examined.

As a result of study by the inventors of the present invention, actually, it was found that the component ratio of the resin compositions described in said Documents 2 and 3 was insufficient for canceling a positive intrinsic birefringence with a negative intrinsic birefringence and the birefringence index as a so-called lens molding was extremely high. Moreover, these documents does not even study a refractive index and an Abbe's number which are important optical properties for a lens. Furthermore, effects of the inventions disclosed in these documents are based upon the assumption that they are used as optical substrate materials such as an optical disk.

In addition, it is disclosed that a resin composition which comprises a polycondensation or polyaddition polymer having a fluorene compound as a monomer unit and having at least one sulfur atom in a repeating unit, and an optical device which is produced by injection molding of said resin composition (Patent Document 4). As a result of study by the inventors of the present invention, it was found that the resin composition disclosed in said Patent Document, though having a high refractive index of around nD=1.7, was insufficient for canceling a positive intrinsic birefringence with a negative intrinsic birefringence, and hence the birefringence index as a so-called lens molding was extremely high, and the lens molding would be colored caused by low heat resistance and its reduction of a total light transmittance would be significant. Furthermore, it became clear that, when injection molding is carried out repeatedly, the injection molding machine or the mold would be corroded by decomposed gas containing sulfur and an industrial implementation would be difficult.

As mentioned above, an optical lens having a high refractive index, a low Abbe's number, a low birefringence index, a high transparency and a high glass transition temperature (heat resistance) in a well-balanced manner has not been known so far.

Patent Document 1: Jpn. Pat. Publication No. H7-109342

Patent Document 2: Jpn. Pat. Publication No. H10-101786

Patent Document 3: Jpn. Pat. Publication No. H10-101787

Patent Document 4: Jpn. Pat. Publication No. 2001-106761

DISCLOSURE OF THE INVENTION

Problems to be Solved by the Invention

The problem to be solved by the present invention is to provide an optical lens composed of a polycarbonate resin which can be produced by injection molding industrially and which has a high refractive index, a low Abbe's number, a low birefringence index, a high transparency and a high glass transition temperature (heat resistance) in a well-balanced manner.

Means for Solving the Problems

The inventors of the present invention paid intensive research efforts to dissolve the above problems and, as a result, they found that the above problems can be dissolved by forming an optical lens from a polycarbonate resin comprising 99 to 51 mol % of a constituent unit derived from 9,9-bis(4-(2-hydroxyethoxy)phenyl)fluorene and 1 to 49 mol % of a constituent unit derived from bisphenol A, and thus completed the present invention.

Thus, the present invention relates to an optical lens shown below.

[1] An optical lens composed of a polycarbonate resin which comprises 99 to 51 mol % of a constituent unit derived from 9,9-bis(4-(2-hydroxyethoxy)phenyl)fluorene represented by the following formula (1) and 1 to 49 mol % of a constituent unit derived from bisphenol A represented by the following formula (2).

[Chemical Formula 1]

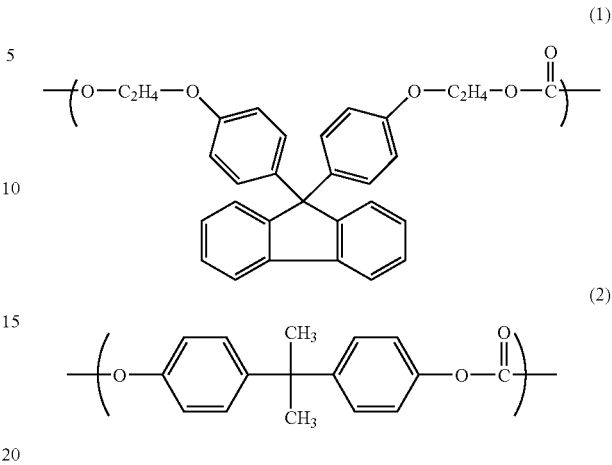

[2] The optical lens according to claim 1, wherein said polycarbonate resin comprises 95 to 80 mol % of a constituent unit derived from 9,9-bis(4-(2-hydroxyethoxy)phenyl)fluorene represented by the formula (1) and 5 to 20 mol % of a constituent unit derived from bisphenol A represented by the formula (2).

[3] The optical lens according to claim 1 or 2, wherein the reduced viscosity of said polycarbonate resin at 20° C. as a solution of the concentration of 0.5 g/dl using methylene chloride as a solvent is 0.2 dl/g or higher.

[4] The optical lens according to claims 1 to 3, wherein the glass transition temperature of said polycarbonate resin is in the range of 120 to 160° C.

[5] The optical lens according to claims 1 to 4, wherein said polycarbonate resin is obtained by reacting a diol component comprising 99 to 51 mol % of 9,9-bis(4-(2-hydroxyethoxy)phenyl)fluorene represented by the following formula (1') and 1 to 49 mol % of bisphenol A represented by the following formula (2') with a carbonate diester.

[Chemical Formula 2]

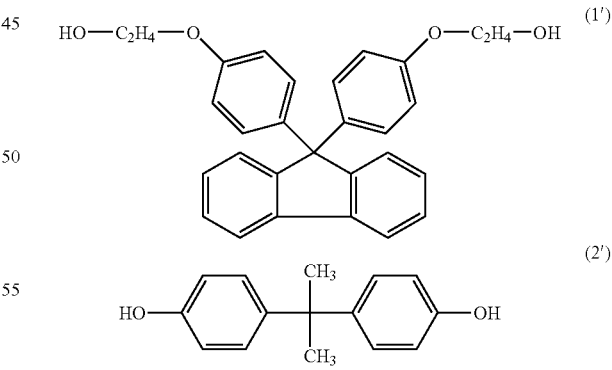

[6] The optical lens according to claims 1 to 5, which has a refractive index of 1.60 to 1.65 and an Abbe's number of 30 or smaller.

[7] The optical lens according to claims 1 to 6, which has a total light transmittance of 85.0% or higher.

[8] The optical lens according to claims 1 to 7, which has a birefringence index of 300 nm or lower.

Effects of the Invention

According to the present invention, an excellent high-refractive-index optical lens which has a high refractive index, a low Abbe's number, a high transparency and a high glass transition temperature (heat resistance) in a well-balanced manner and has substantially no optical distortion with a low birefringence index can be obtained. In addition, the optical lens of the present invention can be produced by injection molding and has a high productivity with a low price.

BEST MODE FOR CARRYING OUT THE INVENTION

(1) Polycarbonate Resin

The optical lens of the present invention is composed of a polycarbonate resin which comprises a constituent unit represented by the following formula (1) (hereinafter, "constituent unit (1)") and a constituent unit represented by the following formula (2) (hereinafter, "constituent unit (2)").

[Chemical Formula 3]

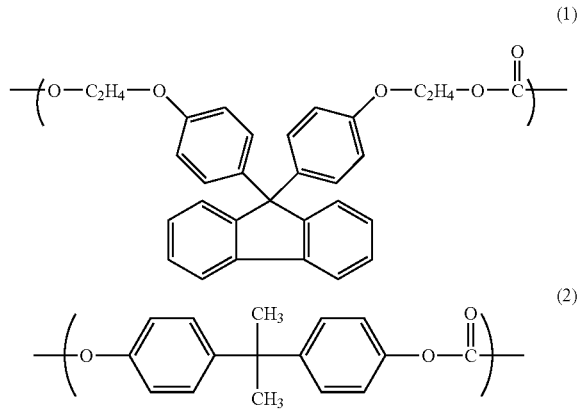

The above constituent unit (1) is a constituent unit derived from 9,9-bis(4-(2-hydroxyethoxy)phenyl)fluorene. The content of the constituent unit (1) is 99 to 51 mol %, preferably 95 to 65 mol %, more preferably 95 to 80 mol %, most preferably 90 to 85 mol % based upon the total carbonate units constituting the polycarbonate resin of the present invention.

The above constituent unit (2) is a constituent unit derived from 2,2-bis(4-hydroxyphenyl)propane (bisphenol A). The content of the constituent unit (2) is 1 to 49 mol %, preferably 5 to 35 mol %, more preferably 5 to 20 mol %, most preferably 10 to 15 mol % based upon the total carbonate units constituting the polycarbonate resin of the present invention.

It would not be desirable if the content of the constituent unit (1) is too low, because the positive birefringence of the optical lens composed of the polycarbonate resin may become high. It would not be desirable if the content of the constituent unit (1) is too high, because the positive birefringence may also become high.

The preferable weight average molecular weight in terms of polystyrene (Mw) of the polycarbonate to be used in the present invention is 20,000 to 300,000. The reduced viscosity at 20° C. as a solution of the concentration of 0.5 g/dl using methylene chloride as a solvent ($\eta sp/C$) is 0.16 dl/g or higher, preferably in the range of 0.16 to 2.1 dl/g.

More preferably, the weight average molecular weight (Mw) in terms of polystyrene is 30,000 to 120,000 and the reduced viscosity ($\eta sp/C$) is 0.20 dl/g or higher, most preferably 0.23 to 0.84 dl/g.

It would not be desirable if Mw is lower than 20,000, because the optical lens may become fragile. It would not be desirable if Mw is higher than 300,000, because the melt viscosity may become too high and it may become difficult to take out the resin after producing, and in addition, the flowability may become poor and it may be difficult to mold by injection molding in the molten state.

The polycarbonate resin to be used in the present invention is a polycarbonate copolymer which can be containing a random, a block or an alternating copolymer structure.

The preferable glass transition temperature (Tg) of the polycarbonate resin to be used in the present invention is 95 to 180° C., more preferably 120 to 160° C. It would not be desirable if Tg is lower than 95° C., because the operating temperature range may become too narrow. It would not be desirable if Tg is higher than 180° C., because the molding conditions carrying out actual injection molding may be strict.

Furthermore, it is preferable to blend an antioxidant, a release agent, an ultraviolet absorber, a fluidity modifier, a crystal nuclear agent, a reinforcing agent, a dyestuff, an antistatic agent, or an antibacterial agent or the like with the polycarbonate resin of the present invention

(2) Process for Producing the Polycarbonate Resin

The polycarbonate resin to be used in the present invention can be produced by a known melt polycondensation wherein two diols which derive the above constituent unit (1) and constituent unit (2) are reacted with a carbonate diester under the presence of a basic compound catalyst, a transesterification catalyst or a mixed catalyst composed thereof.

The diol component which derives the above constituent unit (1) is 9,9-bis(4-(2-hydroxyethoxy)phenyl)fluorene represented by the following formula (1'). The diol component which derives the constituent unit (2) is 2,2-bis(4-hydroxyphenyl)propane (bisphenol A) represented by the following formula (2').

[Chemical Formula 4]

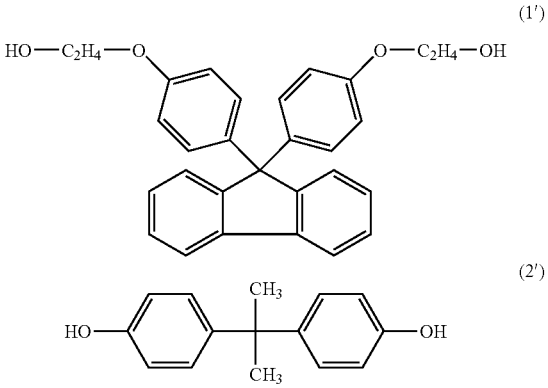

Examples of the carbonate diester include diphenylcarbonate, ditolylcarbonate, bis(chlorophenyl)carbonate, m-cresyl carbonate, dimethylcarbonate, diethylcarbonate, dibutylcarbonate and dicyclohexylcarbonate. Among them, diphenylcarbonate is most preferable. The carbonate diester is used at a ratio of preferably 0.97-1.20 mol, more preferably 0.98-1.10 mol based upon 1 mol of the diol component.

Examples of the basic compound catalyst include an alkali metal compound, alkali earth metal compound and a nitrogen-containing compound.

Examples of the alkali metal compounds to be used in the present invention include an organic acid salt, an inorganic salt, an oxide, a hydroxide, a hydride and an alkoxide of alkali metal. Specifically, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate, sodium benzoate, potassium benzoate, cesium benzoate, lithium benzoate, dibasic sodium phosphate, dibasic potassium phosphate, dibasic lithium phosphate, dibasic sodium phenyl phosphate; a disodium salt, a dipotassium salt, a dicesium salt or a dilithium salt of bisphenol A; a sodium salt, a potassium salt, a cesium salt or a lithium salt of phenol; or the like are used.

Examples of the alkali earth metal compounds include an organic acid salt, an inorganic salt, an oxide, a hydroxide, a hydride or an alkoxide of alkali earth metal. Specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate or the like are used.

Examples of the nitrogen-containing compounds include a quaternary ammonium hydroxide, a salt thereof and amines. Specifically, quaternary ammonium hydroxides having alkyl groups, aryl groups or the like such as tetramethyl ammonium hydroxide, tetraethyl ammonium hydroxide, tetrapropyl ammonium hydroxide, tetrabutyl ammonium hydroxide and trimethylbenzyl ammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazoles; or a base or a basic salt such as ammonia, tetramethyl ammonium borohydride, tetrabutyl ammonium borohydride, tetrabutyl ammonium tetraphenylborate, tetraphenyl ammonium tetraphenylborate or the like are used.

As the transesterification catalyst, salts of zinc, tin, zirconium and lead are preferably used. They can be used each independently or in combination with each other.

Examples of the transesterification catalysts include zinc acetate, zinc benzoate, zinc 2-ethylhexanate, tin (II) chloride, tin (IV) chloride, tin (II) acetate, tin (IV) acetate, dibutyl tin dilaurate, dibutyl tin oxide, dibutyl tin dimethoxide, zirconium acetylacetonate, zirconium oxyacetate, zirconium tetrabutoxide, lead (II) acetate and lead (IV) acetate.

These catalysts are used at a ratio of $10^{-9}$ to $10^{-3}$ mol, preferably $10^{-7}$ to $10^{-4}$ mol based upon 1 mol of the total of the dihydroxy compounds.

The melt polycondensation method is a method wherein a melt polycondensation is conducted by transesterification reaction using the above-mentioned starting materials and catalysts under heating at a normal pressure or a reduced pressure with removing by-products. The reaction is carried out by a multiple-step process having two or more steps in general.

More precisely, the reaction of the first step is conducted under the temperature of 120 to 260° C., more preferably 180 to 240° C. for 0.1 to 5 hours, preferably 0.5 to 3 hours. Subsequently, the reaction of dihydroxy compounds with carbonate diesters is conducted by raising the reaction temperature with elevating the degree of reduced pressure of the reaction system and, in the end, the polycondensation reaction is conducted for 0.05 to 2 hours at the temperature of 200 to 350° C. under the reduced pressure of 1 mmHg or lower.

The reaction can be carried out in batch type or in continuous type. The reaction apparatus used for carrying out the above reaction can be a vertical type apparatus equipped with an anchor-shaped agitating blade, a MAXBLEND type agitating blade, a helical ribbon agitating blade or the like, a horizontal type apparatus equipped with a paddle blade, a grading blade, a spectacle-shaped blade or the like, or an extruder type apparatus equipped with a screw. Moreover, it is preferable to use a reaction apparatus which is combined the above apparatuses properly with each other according to the viscosity of polymer.

According to the process for producing the polycarbonate resin to be used in the present invention, in order to keep heat stability and hydrolysis stability after completion of the polymerization reaction, the catalysts are removed or deactivated.

In general, a method for deactivating a catalyst by adding a known acid material is suitably employed. Examples of the acid materials include esters such as butyl benzoate; aromatic sulphonic acids such as p-toluenesulphonic acid; aromatic sulphonic acid esters such as butyl p-toluenesulphonate and hexyl p-toluenesulphonate; phosphoric acids such as phosphorous acid, phosphoric acid and phosphonic acid; phosphites such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite; phosphates such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonates such as diethyl phenylphosphonate; phosphines such as triphenyl phosphine and bis(diphenylphosphino)ethane; boric acids such as boric acid, and phenylboric acid; aromatic sulfonic acids such as a phosphonium salt of dodecylbenzenesulfonic acid, organic halides such as stearic acid chloride, benzoyl chloride and p-toluenesulfonic acid chloride; alkyl sulfate such as dimethyl sulfate; organic halides such as benzyl chloride. These deactivating agents are used in the amount of 0.01 to 50 times mol, preferably 0.3 to 20 times mol based upon the amount of the catalyst. The amount less than 0.01 times mol based upon the amount of the catalyst would be undesirable because the deactivating effect may be insufficient. The amount more than 50 times mol based upon the amount of the catalyst would be undesirable because heat resistance may be deteriorated and the molded product may be easily colored.

After deactivating the catalyst, a process for removing a low-boiling compound in the polymer under a reducing pressure of 0.1 to 1 mmHg at a temperature of 200 to 350° C. can be conducted. For that purpose, a horizontal type apparatus equipped with an agitating blade excellent in surface replacement such as a paddle blade, a grading blade and a spectacle-shaped blade, or a thin-film evaporator can be suitably used.

The polycarbonate resin to be used in the present invention is a polycarbonate resin obtained by reacting two diol components of the dihydroxy compound represented by the above formula (1') and the dihydroxy compound represented by the above formula (2') with the carbonate diester to form a carbonate bond. The proportion of the dihydroxy compound represented by the formula (1') in the total diol components is preferably 99 to 51 mol %, more preferably 65 to 95 mol %, most preferably 80 to 95 mol %. The content of the dihydroxy compound represented by the formula (1') of less than 51 mol % would be undesirable because the positive birefringence of the optical lens obtained by the polycarbonate may be high. The content thereof of more than 99 mol % would also be undesirable because the positive birefringence may be high.

It is desirable that the polycarbonate resin to be used in the present invention has as low foreign matter content as possible and it is preferable to conduct a filtration of melt starting materials and a filtration of a catalyst solution. The mesh of the filter is preferably 5 µm or less, more preferably 1 µm or less. Furthermore, it is preferable to conduct a filtration of the produced polymer by a polymer filter. The mesh of the polymer filter is preferably 100 µm or less, more preferably 30 µm or less. In addition, the process for obtaining a resin pellet should definitely be conducted in a low-dust environment which is preferably the class 1000 or lower, more preferably class 100 or lower.

(3) Optical Lens

The optical lens of the present invention can be obtained by injection molding of the polycarbonate resin of the present invention in the form of a lens by using a injection molding machine or an injection compression molding machine.

Though the molding conditions for injection molding are not particularly limited, the molding temperature is preferably 180 to 280° C., and the injection pressure is preferably 50 to 1700 kg/cm$^2$.

In order to prevent a foreign matter from being mixed into an optical lens as much as possible, the molding environment should also be a low-dust environment which is preferably the class 1000 or lower, more preferably class 100 or lower.

The optical lens of the present invention thus obtained has a refractive index measured by JIS-K-7142 of 1.60 to 1.65, preferably 1.62 to 1.64.

In addition, it has an Abbe's number measured by JIS-K-7142 of 30 or smaller, preferably 27 or smaller.

Moreover, it has a birefringence index measured by the method of ellipsometry: PEM dual lock-in of 300 nm or lower, preferably 100 nm or lower, most preferably 30 nm or lower.

Furthermore, it has a total light transmittance measured by integrating sphere photoelectric photometry of 85.0% or higher, preferably 87.0% or higher.

As mentioned above, the optical lens of the present invention has a high refractive index, a low Abbe's number, a low birefringence index and a high transparency.

It is preferable to use the optical lens of the present invention as the form of an aspheric lens if required. The aspheric lens can make a spherical aberration zero substantially by using a single lens. Therefore, it is not necessary to eliminate the spherical aberration by combining multiple spherical lenses, which can realize reduction of weight and reduction of the production cost. Accordingly, the aspherical lens is particularly useful as a camera lens among optical lenses. The astigmatism of the aspherical lens is preferably 0 to 15 mλ, more preferably 0 to 10 mλ.

Though the thickness of the optical lens of the present invention is not particularly limited and it can be determined extensively according to the usage, it is preferably 0.01 to 30 mm, more preferably 0.1 to 15 mm.

On the surface of the optical lens of the present invention, a coating layer such as an antireflective layer or a hard coat layer can be formed if necessary. The antireflective layer can be a single layer or a multiple layer, and it can be composed of an organic substance or an inorganic substance. Preferably, it is composed of an inorganic substance. More precisely, examples of the inorganic substances include oxides or fluorides such as silicon dioxide, aluminum oxide, zirconium oxide, titanium oxide, cerium oxide, magnesium oxide and magnesium fluoride. Among them, silicon dioxide and zirconium oxide are more preferable, and the combination of silicon dioxide and zirconium oxide is further preferable.

Relating to the antireflective layer, though the combination of single layer/multiple layer, the combination of the components and thickness and the like are not particularly limited, a double-layer structure or a triple-layer structure is preferable and a triple-layer structure is most preferable. In addition, it is preferable to form the antireflective layer so that the total thickness of the antireflective layer is 0.00017 to 3.3% based upon the thickness of the optical lens. More precisely, it is preferable to form the antireflective layer with the thickness of 0.05 to 3 µm, most preferably 1 to 2 µm.

EXAMPLES

The present invention will be described in more detail below referring to Examples. Note that the scope of the present invention is not limited by the following examples.

The measured values in the examples were measured by the following methods or by using the following devices.
1) Weight-average molecular weight in terms of polystyrene (Mw); Measured by GPC using chloroform as a developing solvent, an analytical curve was prepared using a standard polystyrene having a known molecular weight (molecular weight distribution=1). Based upon the analytical curve, Mw was calculated from the retention time of GPC.
2) Glass transition temperature (Tg): Measured by differential scanning calorimeter (DSC).
3) Refractive index nD and Abbe's number ν: The polycarbonate resin was press molded to form a rectangular solid of 3 mm thickness×8 mm×8 mm, and then measurement was conducted by using a refractometer manufactured by ATAGO Co., Ltd.
4) Birefringence index: Measured by an ellipsometer manufactured by JASCO Corporation.
5) Injection molding machine: Used "SH50" manufactured by Sumitomo Heavy Industries, Ltd.
6) Total light transmittance: Measured by "MODEL 1001DP" manufactured by Nippon Denshoku Industries Co., Ltd.

The birefringence index and the total light transmittance were measured for an optical lens obtained by the following examples (the thickness in the center part of the lens; 9 mm)

Example 1

22.41 kg (51.11 mol) of 9,9-bis(4-(2-hydroxyethoxy)phenyl)fluorene, 0.1179 kg (0.5162 mol) of bisphenol A, 8.869 kg (52.66 mol) of diphenylcarbonate and 0.02602 g (3.097× 10$^{-4}$ mol) of sodium hydrogen carbonate were charged into a 50-liter reactor equipped with an agitator and a distiller and the temperature was raised up to 215° C. for 1 hour under 760 Torr in a nitrogen atmosphere, and then stirred.

Then, the degree of reduced pressure was adjusted to 150 Torr in 15 minutes and a transesterification reaction was carried out keeping the conditions of 215° C. and 150 Torr for 20 minutes. Further, the temperature was raised to 240° C. at a rate of 37.5° C./hr and the reaction system was kept under the conditions of 240° C. and 150 Torr for 10 minutes. Thereafter, the degree of reduced pressure was adjusted to 120 Torr in 10 minutes and the reaction system was kept under the conditions of 240° C. and 120 Torr for 70 minutes. Subsequently, the degree of reduced pressure was adjusted to 100 Torr in 10 minutes and the reaction system was kept under the conditions of 240° C. and 100 Torr for 10 minutes. Furthermore, the degree of reduced pressure was adjusted to 1 Torr or lower in 40 minutes and polymerization reaction was carried out with stirring under the conditions of 240° C. and 1 Torr or lower for 10 minutes. After completion of the reaction, nitrogen gas was injected into the reaction vessel to pressurize and the polycarbonate resin thus produced was extracted with being pelletized.

The polycarbonate resin thus obtained had Mw of 49,600, a reduced viscosity of 0.44 dl/g, and Tg of 160° C. 10.0 kg of the polycarbonate resin was dried in vacuum at 100° C. for 24 hours. Then, an anti-catalyst (1.5 ppm of phosphorous acid and 50 ppm of diphenyl phosphite), an antioxidant (500 ppm of trade name; "ADK STAB PEP-36", manufactured by ADEKA Corporation, and 200 ppm of trade name "HP-136", manufactured by Ciba Specialty Chemicals K. K.), and an antioxidant (300 ppm of glycerin monostearate) were mixed therewith and the mixture was kneaded by an extruder at 250° C. to pelletize to obtain a pellet. The pellet had Mw of 49,100.

After drying the pellet in vacuum at 100° C. for 24 hours, injection molding was carried out at a cylinder temperature of 250° C. and a mold temperature of 120° C. to obtain a double-convex lens (the thickness in the center part of the lens; 9 mm) having a diameter of 9.4 mm and a biconvex curvature radius of 5.0 mm. The refractive index of said convex lens was measured and the results of nD=1.64 and Abbe's number ν=23 were obtained. In addition, the birefringence index of said resin lens was measured and the result of 56 nm was obtained, whereby it was confirmed that the lens had an extremely low birefringence index and had substantially no optical distortion. The total light transmittance was also measured and the result of 90% was obtained.

Example 2

15.46 kg (35.26 mol) of 9,9-bis(4-(2-hydroxyethoxy)phenyl)fluorene, 1.203 kg (5.269 mol) of bisphenol A, 8.900 kg (41.55 mol) of diphenylcarbonate and 0.02043 g (2.432×10$^{-4}$ mol) of sodium hydrogen carbonate were charged into a 50-liter reactor equipped with an agitator and a distiller and the temperature was raised up to 215° C. for 1 hour under 760 Torr in a nitrogen atmosphere, and then stirred.

Then, the degree of reduced pressure was adjusted to 150 Torr in 15 minutes and a transesterification reaction was carried out keeping the conditions of 215° C. and 150 Torr for 20 minutes. Further, the temperature was raised to 240° C. at a rate of 37.5° C./hr and the reaction system was kept under the conditions of 240° C. and 150 Torr for 10 minutes. Thereafter, the degree of reduced pressure was adjusted to 120 Torr in 10 minutes and the reaction system was kept under the conditions of 240° C. and 120 Torr for 70 minutes. Subsequently, the degree of reduced pressure was adjusted to 100 Torr in 10 minutes and the reaction system was kept under the conditions of 240° C. and 100 Torr for 10 minutes. Furthermore, the degree of reduced pressure was adjusted to 1 Torr or lower in 40 minutes and polymerization reaction was carried out with stirring under the conditions of 240° C. and 1 Torr or lower for 10 minutes. After completion of the reaction, nitrogen gas was injected into the reaction vessel to pressurize and the polycarbonate resin thus produced was extracted with being pelletized.

The polycarbonate resin thus obtained had Mw of 56,800, a reduced viscosity of 0.57 dl/g, and Tg of 158° C. 10.0 kg of the polycarbonate resin was dried in vacuum at 100° C. for 24 hours. Then, an anti-catalyst (1.5 ppm of phosphorous acid and 50 ppm of diphenyl phosphite), an antioxidant (500 ppm of trade name; "ADK STAB PEP-36", manufactured by ADEKA Corporation, and 200 ppm of trade name; "HP-136", manufactured by Ciba Specialty Chemicals K.K.), and an antioxidant (300 ppm of glycerin monostearate) were mixed therewith and the mixture was kneaded by an extruder at 250° C. to pelletize to obtain a pellet. The pellet had Mw of 56,100.

After drying the pellet in vacuum at 100° C. for 24 hours, injection molding was carried out at a cylinder temperature of 250° C. and a mold temperature of 120° C. to obtain a double-convex lens (the thickness in the center part of the lens; 9 mm) having a diameter of 9.4 mm and a biconvex curvature radius of 5.0 mm. The refractive index of said convex lens was measured and the results of nD=1.63 and Abbe's number ν=24 were obtained. In addition, the birefringence index of said resin lens was measured and the result of 2 nm was obtained, whereby it was confirmed that the lens had an extremely low birefringence index and had substantially no optical distortion. The total light transmittance was also measured and the result of 90% was obtained.

Example 3

9.167 kg (20.90 mol) of 9,9-bis(4-(2-hydroxyethoxy)phenyl)fluorene, 4.585 kg (20.084 mol) of bisphenol A, 9.000 kg (42.01 mol) of diphenylcarbonate and 0.02066 g (2.459×10$^{-4}$ mol) of sodium hydrogen carbonate were charged into a 50-liter reactor equipped with an agitator and a distiller and the temperature was raised up to 215° C. for 1 hour under 760 Torr in a nitrogen atmosphere, and then stirred.

Then, the degree of reduced pressure was adjusted to 150 Torr in 15 minutes and a transesterification reaction was carried out keeping the conditions of 215° C. and 150 Torr for 20 minutes. Further, the temperature was raised to 240° C. at a rate of 37.5° C./hr and the reaction system was kept under the conditions of 240° C. and 150 Torr for 10 minutes. Thereafter, the degree of reduced pressure was adjusted to 120 Torr in 10 minutes and the reaction system was kept under the conditions of 240° C. and 120 Torr for 70 minutes. Subsequently, the degree of reduced pressure was adjusted to 100 Torr in 10 minutes and the reaction system was kept under the conditions of 240° C. and 100 Torr for 10 minutes. Furthermore, the degree of reduced pressure was adjusted to 1 Torr or lower in 40 minutes and polymerization reaction was carried out with stirring under the conditions of 240° C. and 1 Torr or lower for 10 minutes. After completion of the reaction, nitrogen gas was injected into the reaction vessel to pressurize and the polycarbonate resin thus produced was extracted with being pelletized.

The polycarbonate resin thus obtained had Mw of 40,800, a reduced viscosity of 0.37 dl/g, and Tg of 152° C. 10.0 kg of the polycarbonate resin was dried in vacuum at 100° C. for 24 hours. Then, an anti-catalyst (1.5 ppm of phosphorous acid and 50 ppm of diphenyl phosphite), an antioxidant (500 ppm of trade name; "ADK STAB PEP-36", manufactured by ADEKA Corporation, and 200 ppm of trade name; "HP-136", manufactured by Ciba Specialty Chemicals K.K.), and an antioxidant (300 ppm of glycerin monostearate) were mixed therewith and the mixture was kneaded by an extruder at 250° C. to pelletize to obtain a pellet. The pellet had Mw of 40,600.

After drying the pellet in vacuum at 100° C. for 24 hours, injection molding was carried out at a cylinder temperature of 250° C. and a mold temperature of 120° C. to obtain a double-convex lens (the thickness in the center part of the lens; 9 mm) having a diameter of 9.4 mm and a biconvex curvature radius of 5.0 mm. The refractive index of said convex lens was measured and the results of nD=1.62 and Abbe's number ν=26 were obtained. In addition, the birefringence index of said resin lens was measured and the result of 89 nm was obtained, whereby it was confirmed that the lens had an extremely low birefringence index and had substantially no optical distortion. The total light transmittance was also measured and the result of 90% was obtained.

Comparative Example 1

12.04 kg (27.46 mol) of 9,9-bis(4-(2-hydroxyethoxy)phenyl)fluorene, 6.000 kg (28.01 mol) of diphenylcarbonate and 0.01384 g ($1.648 \times 10^{-4}$ mol) of sodium hydrogen carbonate were charged into a 50-liter reactor equipped with an agitator and a distiller and the temperature was raised up to 215° C. for 1 hour under 760 Torr in a nitrogen atmosphere, and then stirred.

Then, the degree of reduced pressure was adjusted to 150 Torr in 15 minutes and a transesterification reaction was carried out keeping the conditions of 215° C. and 150 Torr for 20 minutes. Further, the temperature was raised to 240° C. at a rate of 37.5° C./hr and the reaction system was kept under the conditions of 240° C. and 150 Torr for 10 minutes. Thereafter, the degree of reduced pressure was adjusted to 120 Torr in 10 minutes and the reaction system was kept under the conditions of 240° C. and 120 Torr for 70 minutes. Subsequently, the degree of reduced pressure was adjusted to 100 Torr in 10 minutes and the reaction system was kept under the conditions of 240° C. and 100 Torr for 10 minutes. Furthermore, the degree of reduced pressure was adjusted to 1 Torr or lower in 40 minutes and polymerization reaction was carried out with stirring under the conditions of 240° C. and 1 Torr or lower for 10 minutes. After completion of the reaction, nitrogen gas was injected into the reaction vessel to pressurize and the polycarbonate resin thus produced was extracted with being pelletized.

The polycarbonate resin thus obtained had Mw of 76,900, a reduced viscosity of 0.69 dl/g, and Tg of 161° C. 10.0 kg of the polycarbonate resin was dried in vacuum at 100° C. for 24 hours. Then, an anti-catalyst (1.5 ppm of phosphorous acid and 50 ppm of diphenyl phosphite), an antioxidant (500 ppm of trade name; "ADK STAB PEP-36", manufactured by ADEKA Corporation, and 200 ppm of trade name; "HP-136", manufactured by Ciba Specialty Chemicals K.K.), and an antioxidant (300 ppm of glycerin monostearate) were mixed therewith and the mixture was kneaded by an extruder at 250° C. to pelletize to obtain a pellet. The pellet had Mw of 75,800.

After drying the pellet in vacuum at 100° C. for 24 hours, injection molding was carried out at a cylinder temperature of 250° C. and a mold temperature of 120° C. to obtain a double-convex lens (the thickness in the center part of the lens; 9 mm) having a diameter of 9.4 mm and a biconvex curvature radius of 5.0 mm. The birefringence index of said resin lens was measured and the result of 350 nm was obtained, whereby it was confirmed that the lens had a high birefringence index and had a large optical distortion.

Comparative Example 2

6.944 kg (15.84 mol) of 9,9-bis(4-(2-hydroxyethoxy)phenyl)fluorene, 5.422 kg (23.75 mol) of bisphenol A, 8.650 kg (40.38 mol) of diphenylcarbonate and 0.01995 g ($2.375 \times 10^{-4}$ mol) of sodium hydrogen carbonate were charged into a 50-liter reactor equipped with an agitator and a distiller and the temperature was raised up to 215° C. for 1 hour under 760 Torr in a nitrogen atmosphere, and then stirred.

Then, the degree of reduced pressure was adjusted to 150 Torr in 15 minutes and a transesterification reaction was carried out keeping the conditions of 215° C. and 150 Torr for 20 minutes. Further, the temperature was raised to 240° C. at a rate of 37.5° C./hr and the reaction system was kept under the conditions of 240° C. and 150 Torr for 10 minutes. Thereafter, the degree of reduced pressure was adjusted to 120 Torr in 10 minutes and the reaction system was kept under the conditions of 240° C. and 120 Torr for 70 minutes. Subsequently, the degree of reduced pressure was adjusted to 100 Torr in 10 minutes and the reaction system was kept under the conditions of 240° C. and 100 Torr for 10 minutes. Furthermore, the degree of reduced pressure was adjusted to 1 Torr or lower in 40 minutes and polymerization reaction was carried out with stirring under the conditions of 240° C. and 1 Torr or lower for 10 minutes. After completion of the reaction, nitrogen gas was injected into the reaction vessel to pressurize and the polycarbonate resin thus produced was extracted with being pelletized.

The polycarbonate resin thus obtained had Mw of 59,800, a reduced viscosity of 0.54 dl/g, and Tg of 153° C. 10.0 kg of the polycarbonate resin was dried in vacuum at 100° C. for 24 hours. Then, an anti-catalyst (1.5 ppm of phosphorous acid and 50 ppm of diphenyl phosphite), an antioxidant (500 ppm of trade name; "ADK STAB PEP-36", manufactured by ADEKA Corporation, and 200 ppm of trade name; "HP-136", manufactured by Ciba Specialty Chemicals K.K.), and an antioxidant (300 ppm of glycerin monostearate) were mixed therewith and the mixture was kneaded by an extruder at 250° C. to pelletize to obtain a pellet. The pellet had Mw of 59,000.

After drying the pellet in vacuum at 100° C. for 24 hours, injection molding was carried out at a cylinder temperature of 250° C. and a mold temperature of 120° C. to obtain a double-convex lens (the thickness in the center part of the lens; 9 mm) having a diameter of 9.4 mm and a biconvex curvature radius of 5.0 mm. The birefringence index of said resin lens was measured and the result of 850 nm was obtained, whereby it was confirmed that the lens had a high birefringence index and had a large optical distortion.

Comparative Example 3

A polycarbonate resin from bisphenol A, manufactured by Mitsubishi Engineering-Plastics Corporation, trade name; "Iupilon H-4000" (Mw=33,000, Reduced Viscosity=0.43 dl/g, Tg=144° C.), was used.

The pellet was dried in vacuum at 100° C. for 24 hours, and then injection molding was carried out at a cylinder temperature of 255° C. and a mold temperature of 120° C. to obtain a double-convex lens (the thickness in the center part of the lens; 9 mm) having a diameter of 9.4 mm and a biconvex curvature radius of 5.0 mm. The birefringence index of said resin lens was measured and the result of 1240 nm was obtained, whereby it was confirmed that the lens had a high birefringence index and had a large optical distortion.

The above-mentioned results of the examples and the comparative examples were summed up and shown in Tables 1, 2, and 3. In addition, standard for evaluation of the optical distortion was shown in Table 4.

TABLE 1

| | Component Ratio of Material Compositions |
|---|---|
| Example 1 | Formula (1)/Formula (2) = 99 mol %/1 mol % |
| Example 2 | Formula (1)/Formula (2) = 87 mol %/13 mol % |
| Example 3 | Formula (1)/Formula (2) = 51 mol %/49 mol % |
| Comp. Example 1 | Formula (1)/Formula (2) = 100 mol %/0 mol % |
| Comp. Example 2 | Formula (1)/Formula (2) = 40 mol %/60 mol % |
| Comp. Example 3 | Formula (1)/Formula (2) = 0 mol %/100 mol % |

TABLE 2

| | Refractive Index nD | Abbe's Number | Tg | Total Light Transmittance |
|---|---|---|---|---|
| Example 1 | 1.64 | 23 | 160° C. | 90% |
| Example 2 | 1.63 | 24 | 158° C. | 90% |
| Example 3 | 1.62 | 26 | 152° C. | 90% |
| Comp. Example 1 | 1.64 | 23 | 161° C. | 90% |
| Comp. Example 2 | 1.61 | 27 | 150° C. | 89% |
| Comp. Example 3 | 1.59 | 30 | 148° C. | 90% |

TABLE 3

| | Birefringence Index (nm) | Optical Distortion |
|---|---|---|
| Example 1 | 56 | Small |
| Example 2 | 2 | Extremely Small |
| Example 3 | 89 | Small |
| Comp. Example 1 | 350 | Large |
| Comp. Example 2 | 850 | Large |
| Comp. Example 3 | 1240 | Large |

TABLE 4

| Birefringence Index | Evaluation of Optical Distortion |
|---|---|
| Higher than 100 nm | Large |
| 100 nm or lower | Small |
| 30 nm or lower | Extremely Small |

INDUSTRIAL APPLICABILITY

According to the present invention, an excellent optical lens having a high refractive index which has a low birefringence index and has substantially no optical distortion. The optical lens of the present invention can be produced by injection molding with a high productivity at a low price. Therefore, it can be used in the field of a camera, a telescope, binoculars, TV projector or the like wherein an expensive glass lens having a high refractive index had been used conventionally, and thus it is highly useful. In addition, according to the present invention, an aspherical lens having a high refractive index and a low birefringence index, which would be difficult in processing technically if it is a glass lens, can be produced easily by injection molding, and thus it is highly useful.

What is claimed is:

1. An optical lens composed of a polycarbonate resin which consists essentially of 99 to 80 mol % of a constituent unit derived from 9,9-bis(4-(2-hydroxyethoxy)phenyl)fluorene represented by the following formula (1):

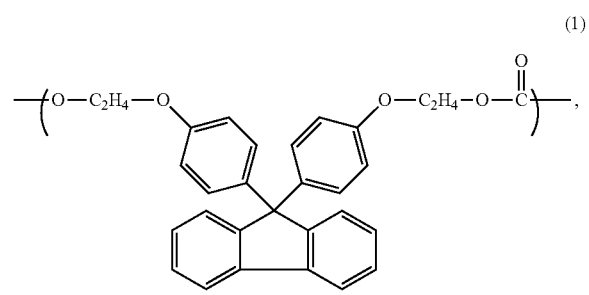

and 1 to 20 mol % of a constituent unit derived from bisphenol A represented by the following formula (2):

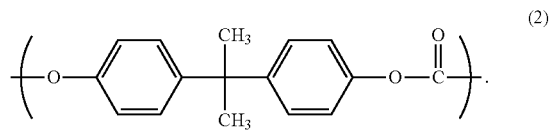

2. The optical lens according to claim 1, wherein said polycarbonate resin consists essentially of 95 to 80 mol % of the constituent unit derived from 9,9-bis(4-(2-hydroxyethoxy)phenyl)fluorene represented by the formula (1) and 5 to 20 mol % of the constituent unit derived from bisphenol A represented by the formula (2).

3. The optical lens according to claim 1, wherein the reduced viscosity of said polycarbonate resin at 20° C. as a solution of the concentration of 0.5 g/dl using methylene chloride as a solvent is 0.2 dl/g or higher.

4. The optical lens according to claim 1, wherein the glass transition temperature of said polycarbonate resin is in the range of 120 to 160° C.

5. The optical lens according to claim 1, wherein said polycarbonate resin is obtained by reacting a diol component consisting essentially of 99 to 80 mol % of 9,9-bis(4-(2-hydroxyethoxy)phenyl)fluorene represented by the following formula (1'):

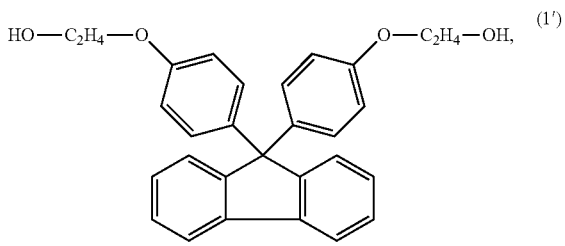

and 1 to 20 mol % of bisphenol A represented by the following formula (2'):

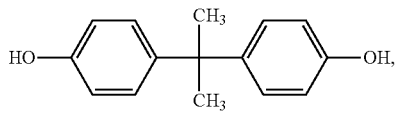

(2')

with a carbonate diester.

6. The optical lens according to claim 1, which has a birefringence index of 300 nm or lower.

7. The optical lens according to claim 1, which has a refractive index of 1.60 to 1.65 and an Abbe's number of 30 or smaller.

8. The optical lens according to claim 1, which has a total light transmittance of 85.0% or higher.

* * * * *